United States Patent
Fitting et al.

[15] 3,698,509
[45] Oct. 17, 1972

[54] INLET NOISE SILENCER FOR A JET ENGINE

[72] Inventors: Samuel E. Fitting, East Hartland, Conn.; Gary W. Green, Springfield, Mass.

[73] Assignee: United Aircraft Corporation, East Hartford, Conn.

[22] Filed: June 24, 1971

[21] Appl. No.: 156,255

[52] U.S. Cl............181/33 HA, 181/50, 181/51, 181/53, 181/70, 415/119
[51] Int. Cl..........F01n 1/10, F01n 1/14, B64d 33/02
[58] Field of Search...137/15.1, 15.2; 181/33 H, 33 HA, 181/33 HB, 42, 50, 33 K, 53, 43, 51, 68–70, 46, 56, 35 A; 415/119

[56] References Cited

UNITED STATES PATENTS 2,842,222   7/1958   Hughett.............181/33 HA
3,462,949   8/1969   Anderson et al......181/33 HB
3,525,418   8/1970   Smith et al...........181/51 X

FOREIGN PATENTS OR APPLICATIONS 62,490   6/1968   Germany.............181/35 A Primary Examiner—Robert S. Ward, Jr.
Attorney—Norman Friedland

[57] ABSTRACT

The noise silencer consists of an annular chamber being in communication with the inlet of the gas turbine engine and a substantially U-shaped baffle member disposed between the inlet of the silencer and the inlet of the engine wherein the legs of the U are spaced substantially parallel to the side walls of the cavity to define flow channels with L/D ratios (length to diameter or the smallest planar cross-sectional dimension when the cross section is other than circular) being greater than ½, which channels serve to guide the air and sound waves over a resistive acoustical lining and provide a lined bend around which the air and sound waves must pass.

3 Claims, 4 Drawing Figures

PATENTED OCT 17 1972 3,698,509
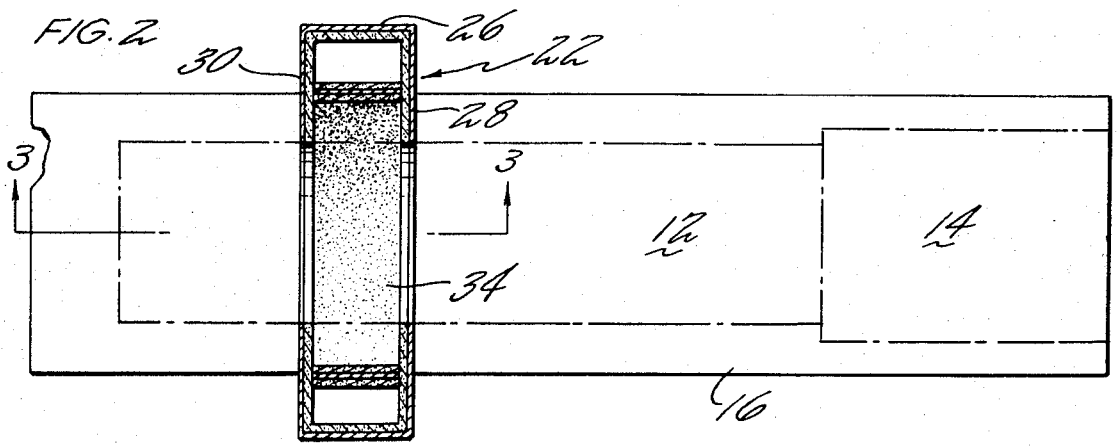
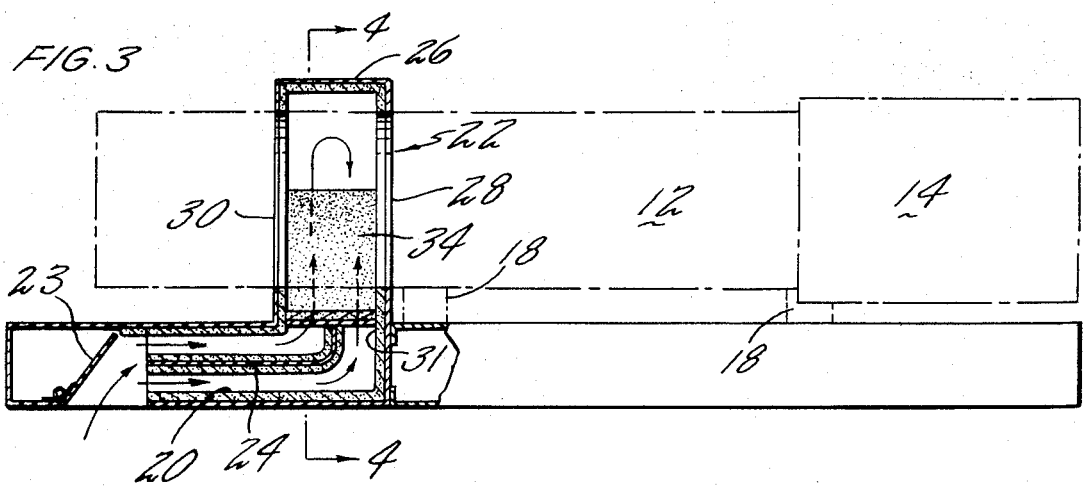
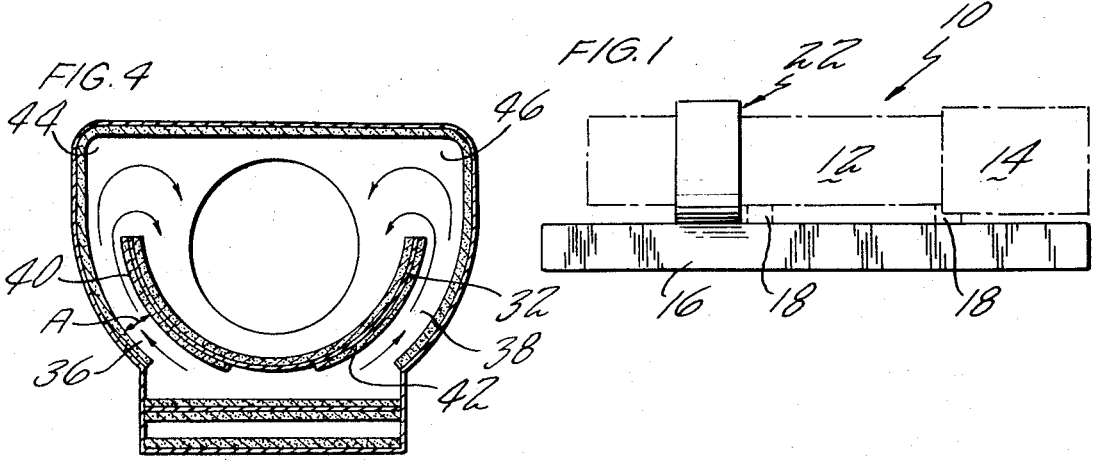
INVENTORS
SAMUEL E. FITTING
GARY W. GREEN
BY Norman Friedland
ATTORNEY

INLET NOISE SILENCER FOR A JET ENGINE

BACKGROUND OF THE INVENTION

This invention relates to improvement in noise suppressors for gas turbine engines and more particularly to improvements in means for reducing the noise propagated by the engine.

The advent of large bodied aircraft has necessitated the need for auxiliary power units which are typically powered by a gas turbine engine as, for example, the Lockheed 1011 airbus which utilizes a PT-6 gas turbine engine manufactured by United Aircraft of Canada Ltd. Gas turbine engines are known to be a source of noise and a concern of this invention is the abatement thereof. While it is generally known that certain acoustical material compatible for aircraft use may be used for reducing the noise level, this material in and of itself is not sufficient to reduce the noise level sufficiently to meet the requirements of aircraft manufacturers and satisfy the comfort of passengers. The purpose of this invention is, therefore, to utilize well-known acoustic material in an inlet silencer in such a manner so as to extract the maximum sound energy of the noise propagated by the engine, thus abating the noise to an acceptable level. By virtue of the present invention it has been found by tests that the noise level has been attenuated by 48 decibels (8,000 Hertz octave band) below the bare engine noise, when used with a simple ducted inlet with splitter. Such noise attenuation has been effectuated by incorporating an inlet silencer located adjacent the inlet of the engine which silencer consists of a casing defining a cavity and a generally arcuate shaped baffle disposed in the casing between the inlet thereof and the inlet of the engine defining with the inner wall of the cavity a pair of channels each of which define an elongated flow channel having an L/D ratio greater than ½. The flow discharging from these channels is received in a wide plenum which is designed to accommodate the flow in such a manner as to reduce the velocity of the air so as to be evenly distributed around the engine inlet.

SUMMARY OF INVENTION

A primary purpose of this invention is to provide an improved inlet silencer for a gas turbine engine.

A still further object of this invention is to provide an inlet noise suppressor for gas turbine engines having a housing defining a cavity portion accommodating flow into the engine and a generally U-shaped baffle disposed between the inlet of the silencer and the inlet of the engine extending between the "line of sight" of the inlet of the engine and the inlet of the silencer and defining with the cavity walls splitter channels having L/D ratios greater than ½. The legs of the U being substantially extended so as to turn the air flow through the channels generally greater than 90° before entering into the inlet of the engine.

A still further object of this invention is to provide an inlet silencer for gas turbine engine as described which is characterized as being capable of extracting substantially maximum sound energy through the use of resistive linings while being relatively small in size, light in weight, and exhibiting a substantially low pressure drop.

Other features and advantages will be apparent from the specification and claims and from the accompanying drawings which illustrate an embodiment of the invention.

BRIEF DESCRIPTION OF THE DRAWINGS

FIG. 1 is a side elevation of the platform and silencer and a block diagram representing the gas turbine engine and the units being driven thereby.

FIG. 2 is a plan view, partly in section, illustrating this invention.

FIG. 3 is a side elevation, partly in section taken along line 3—3 of FIG. 2. FIG. 4 is a sectional view taken along the lines 4—4 of FIG. 3.

DESCRIPTION OF THE PREFERRED EMBODIMENT

While this invention as shown in its preferred embodiment is utilized for a gas turbine engine having a radial inlet, as will be obvious to one ordinarily skilled in this art, such a silencer is equally applicable to a gas turbine engine that has an axial inlet.

Reference is next made to FIGS. 1–4 illustrating the details of this invention comprising an auxiliary power unit generally illustrated in outline by reference numeral 10 consisting of a gas turbine engine 12 drivingly connected to a load compressor fan and electric generator 14. The auxiliary power unit is suitably mounted on platform 16 preferably by shock mounts schematically illustrated by reference numeral 18. Obviously, the platform is rigidly secured to the aircraft in any suitable manner. Passageway 20 formed in the platform serves to communicate ambient air to the inlet of the engine through the silencer 22. An inlet door 23 may be located at the inlet of passageway 20. An acoustically treated splitter member 24 extending centrally in passageway 20 may be incorporated to split the flow being supplied to the silencer 22.

Silencer 22 is preferably fabricated from sheet metal and formed to define an annular cavity surrounding the radial inlet of the engine having a closed top wall 26, parallel spaced walls 28 and 30, and an inlet 31 opening on the bottom. Baffle plate 32 also fabricated from sheet metal is arcuate or generally U-shaped and disposed between the inlet 31 of the silencer and the inlet 34 of the engine and spans between side walls 28 and 30. The top of baffle plate 32 is centrally disposed in inlet 31 to substantially equally divide the flow through channels 36 and 38 formed by the inner wall of the casing 22 and the legs of the U-shaped baffle; it being noted that the L/D ratio of each of the channels is as long as possible and being at least greater than ½. In this case legs 40 and 42 of the U-shaped baffle 32 extend close to the engine inlet centerline so that the discharging flow through the channels 36 and 38 must bend more than 90° before entering the inlet of the engine. This affords additional dissipation of the energy of the sound.

The casing 22 is shaped to define a substantially large plenum 44 which serves to accommodate the air discharging from the channels and reduce the velocity of the air so as to evenly distribute it around the engine inlet. The gradually widening air path of the bend in communication with the plenum also serves to reduce the pressure drop of the air flow.

The surfaces exposed to the sound waves are suitably lined with acoustical resistive material such as a thin sheet of porous glass fiber paper, fiber metal or perforated plate bonded to a honeycomb backing. This backing is bonded to the inner wall of the casing in any suitable manner. Thus, the top surface of the baffle, the inner walls of the casing, the passageway walls of the platform are so lined.

By virtue of this invention the air flow from the inlet of the silencer to the engine takes a somewhat curved path, but relatively aerodynamically smooth to provide minimum pressure drop. However, the noise is routed through the reverse, acoustically lined path by virtue of the baffle and the elongated channels defined thereby so as to dissipate its energy in an optimum manner.

It should be understood that the invention is not limited to the particular embodiment shown and described herein, but that various changes and modifications may be made without departing from the spirit or scope of this novel concept as defined by the following claims.

What is claimed is:

1. A noise silencer for the inlet of a gas turbine engine including a casing surrounding said inlet of the engine defining a cavity, an inlet at one end of said casing for admitting flow of air into said cavity and into said inlet of the engine, a generally U-shaped baffle member having its base disposed centrally of said inlet of said casing and acoustical lining secured to said baffle, and the legs of the U being spaced from the inner walls of said casing defining therewith a pair of channels for directing the flow from the inlet of said casing through a portion of said cavity into the inlet of said engine.

2. A noise silencer as claimed in claim 1 wherein said casing includes parallely spaced side walls and the legs of the U-shaped baffle extend therebetween.

3. Noise silencer for the inlet of a gas turbine engine including a casing surrounding said inlet of the engine defining a cavity, an inlet at one end of said casing oriented so that its centerline is transverse to the centerline of the inlet of the engine for admitting flow of air into said cavity and into said inlet of the engine, a generally U-shaped baffle member having its base disposed centrally of said inlet of said casing, the legs of the U-shaped baffle extending in proximity to the centerline of the inlet of the engine and acoustical lining secured to said baffle and the inner walls of said casing.

* * * * *